United States Patent [19]
Kapany et al.

[11] Patent Number: 4,479,697
[45] Date of Patent: * Oct. 30, 1984

[54] FIBER OPTICS COMMUNICATIONS MODULES

[75] Inventors: Narinder S. Kapany, Woodside; Fred C. Unterleitner, Palo Alto, both of Calif.

[73] Assignee: Kaptron, Inc., Palo Alto, Calif.

[*] Notice: The portion of the term of this patent subsequent to May 11, 1999 has been disclaimed.

[21] Appl. No.: 325,256

[22] Filed: Nov. 27, 1981

Related U.S. Application Data

[63] Continuation-in-part of Ser. No. 66,367, Aug. 14, 1979, Pat. No. 4,329,017.

[51] Int. Cl.³ .............................................. G02B 7/26
[52] U.S. Cl. ............................... 350/96.18; 250/227; 350/96.15; 350/96.19; 350/96.20
[58] Field of Search ............... 350/96.15, 96.16, 96.17, 350/96.18, 96.19, 96.20, 96.21, 162.23, 172, 173, 174, 293, 296; 370/1, 3; 250/227

[56] References Cited

U.S. PATENT DOCUMENTS

| | | | |
|---|---|---|---|
| 3,883,223 | 5/1975 | Hudson | 350/96.16 |
| 4,094,578 | 6/1978 | DiVita et al. | 350/96.15 |
| 4,111,524 | 9/1978 | Tomlinson | 350/96.19 |
| 4,198,117 | 4/1980 | Kobayashi | 350/96.19 |
| 4,290,667 | 9/1981 | Chown | 350/96.18 |
| 4,329,017 | 5/1982 | Kapany et al. | 350/96.15 |

FOREIGN PATENT DOCUMENTS 2655114  6/1977  Fed. Rep. of Germany ... 350/96.16

OTHER PUBLICATIONS

Lynch, "Fiber Optic Connectors," *IBM Tech. Discl. Bulletin*, vol. 13, No. 2, Jul. 1970, pp. 533–534.

*Primary Examiner*—John D. Lee
*Attorney, Agent, or Firm*—Townsend and Townsend

[57] ABSTRACT

A fiber optics coupler module has a portion defining a spherical reflective surface characterized by a self-conjugate plane having the property that a point source of light in the self-conjugate plane is imaged in the self-conjugate plane. The coupler includes first and second optical transceiver terminals adapted to register a source, detector, or fiber end at each of first and second conjugate locations within the self-conjugate plane. The reflective surface passes a fraction of light incident thereon, whereupon a portion of light diverging from the first location passes through the reflective surface along a first optical path. Similarly a portion of light diverging from the second location passes through the reflective surface along a second optical path. The coupler further includes focusing means on the side of the reflective surface remote from the first and second locations for imaging light travelling along the first optical path at a third location, and also for imaging light travelling along the second optical path at a fourth location. In a first series of embodiments, the reflective surface is partially transmissive, partially reflective for wavelengths in a given range. In a second series of embodiments, the reflective surface is a dichroic surface. In a third series of embodiments, the coupler uses a plane reflection grating and collimated light.

31 Claims, 18 Drawing Figures

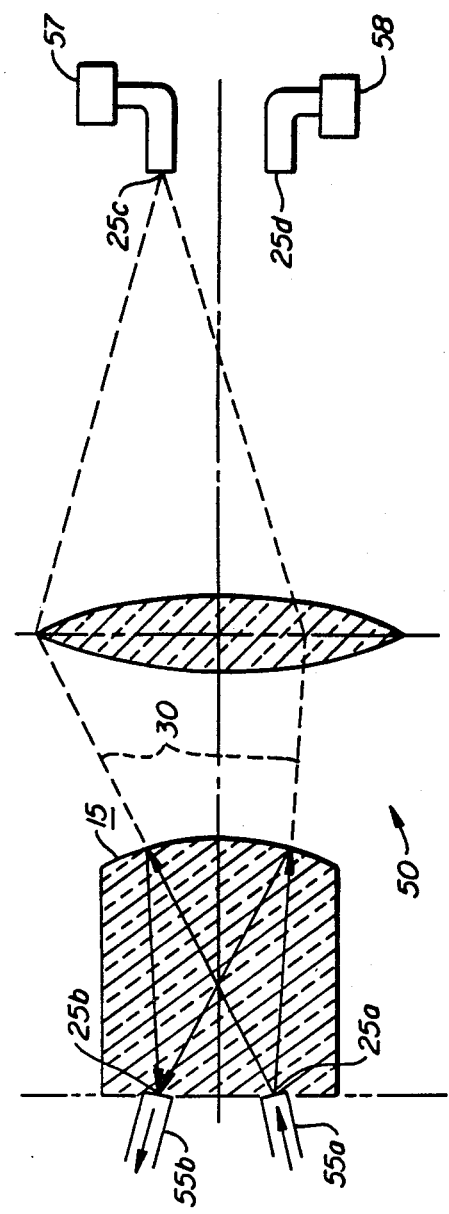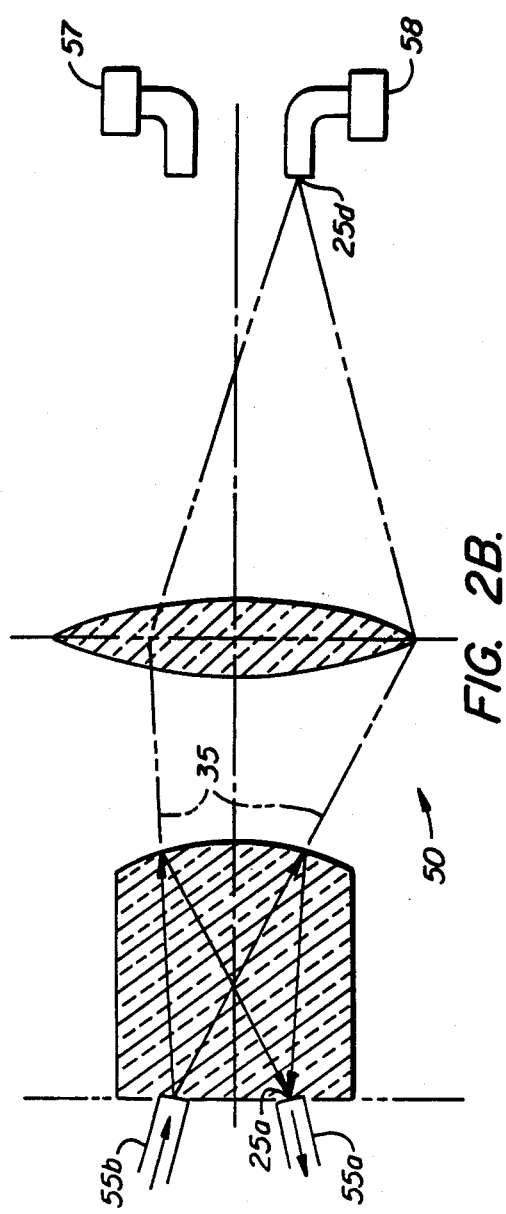

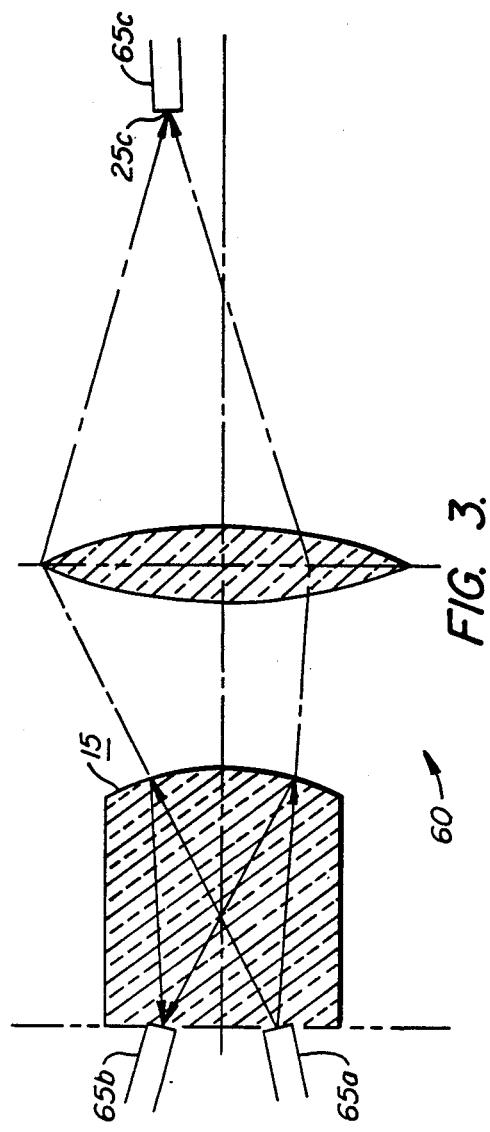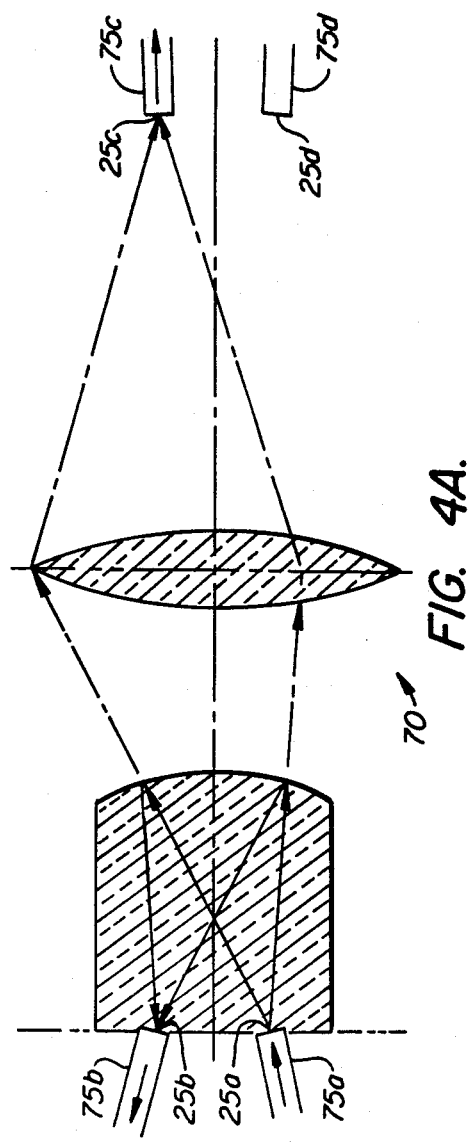

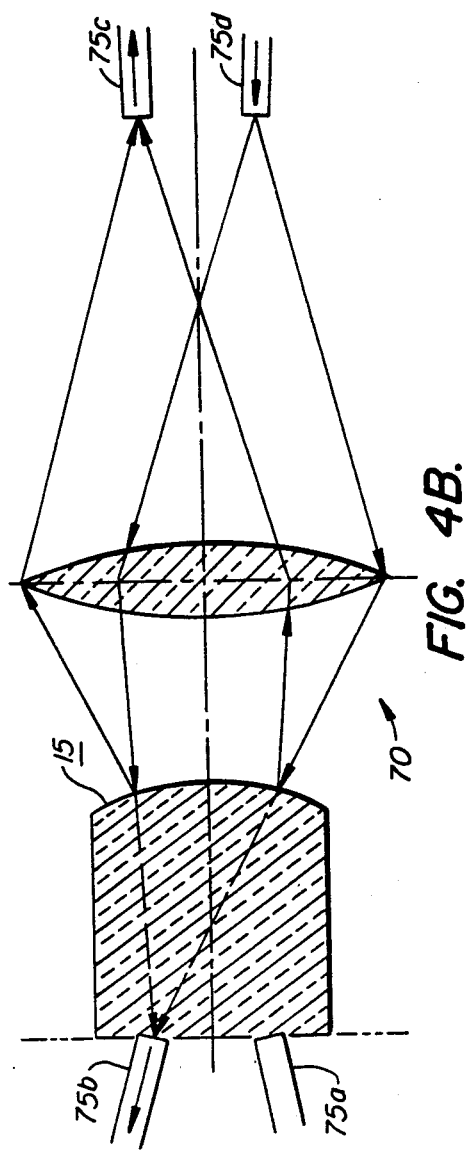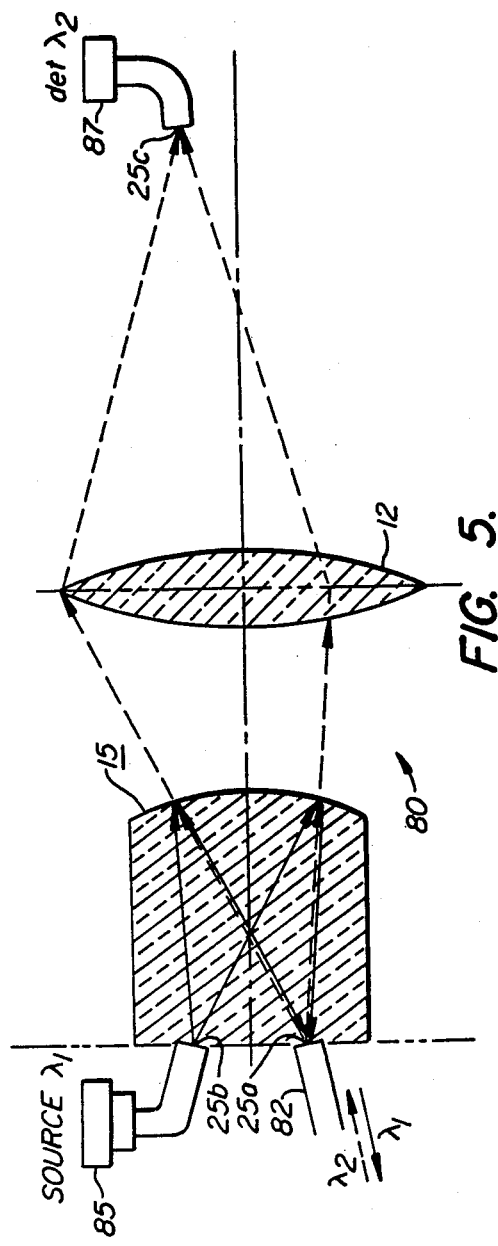

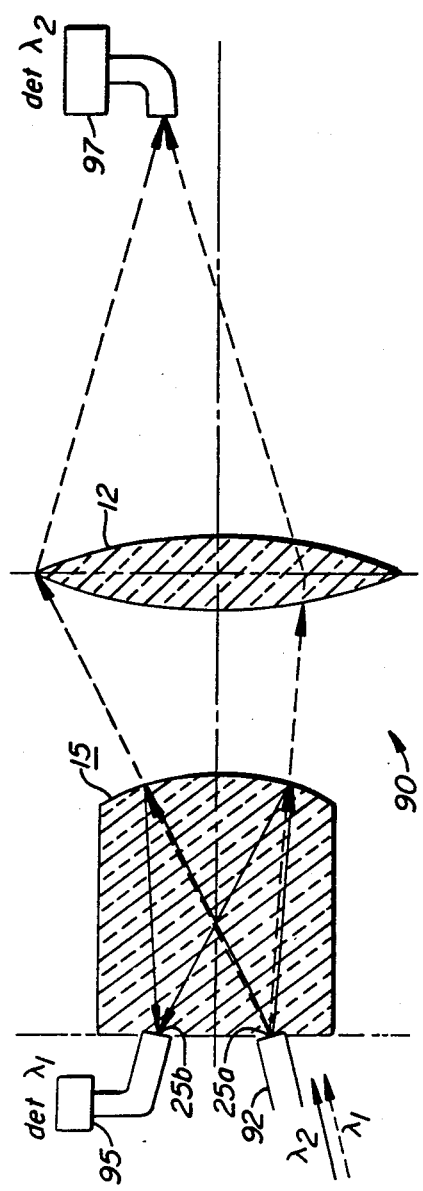
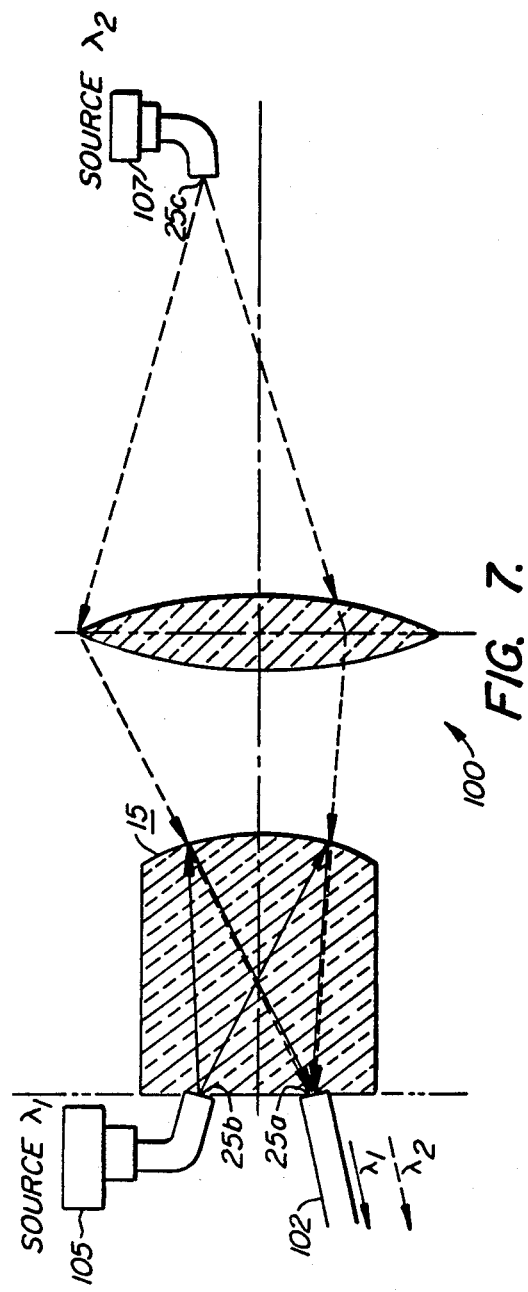

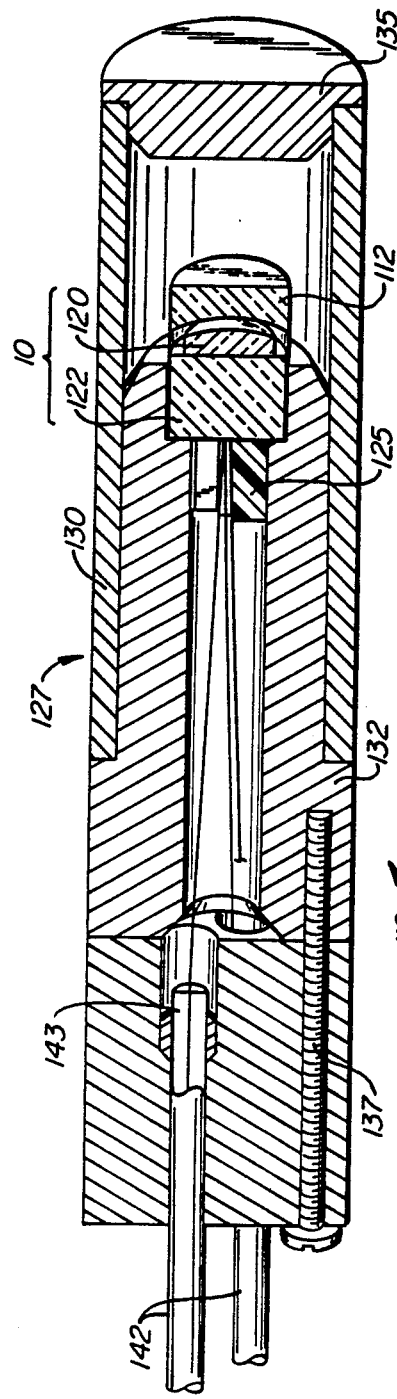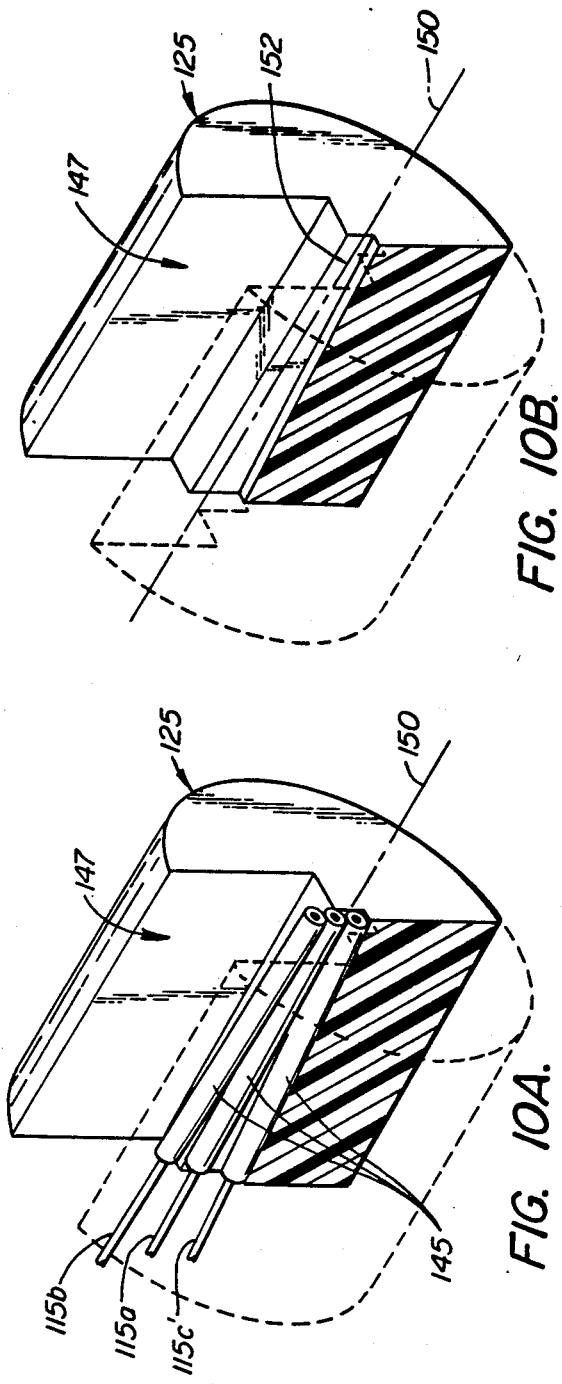

FIBER OPTICS COMMUNICATIONS MODULES

This application is a continuation-in-part of copending U.S. application Ser. No. 66,367, filed Aug. 14, 1979, now U.S. Pat. No. 4,329,017.

FIELD OF THE INVENTION

This invention relates generally to optical fiber communications, and more specifically to modules for intercoupling of light from or to fibers and performing monitoring, splitting, duplexing, and multiplexing functions.

BACKGROUND OF THE INVENTION

As existing communication systems have become increasingly overloaded, optical transmission through transparent fibers has been found to provide a means of achieving a smaller cross-section per message, thus enabling an increased capacity within existing conduit constraints. The basic medium of transmission is an optical fiber. A first type of fiber is a stepped index fiber which comprises a transparent core member and a transparent cladding, the core member having a higher index of refraction than the cladding. Light is transmitted through the core, and contained within the core by internal reflection. So long as the light does not deviate from the fiber axis by more than the complement of the critical angle for the core-cladding interface, total internal reflection with substantially no loss results. A second type of fiber is a graded index fiber whose refractive index gradually decreases away from the fiber axis. Graded index fiber has found increasing favor due to its property that the index gradient tends to equalize the optical path length (transit time) for axial and off-axis rays. Transmission in both types of fiber is highly reliable, and is substantially insensitive to electrical noise, cross coupling between channels, and the like.

As with any communication medium, once a suitable transmission line has been found, the need arises for modules to couple sources and detectors to the line, couple lines together, perform switching, splitting, duplexing, and multiplexing functions. Ultimately, the total system can be no more reliable than these modules. When it is considered that the core of a typical optical communication fiber is characterized by a diameter of only about 50-60 microns, it can be immediately appreciated that such modules must be fabricated and installed to highly precise tolerances.

In order that the inherent reliability of optical fiber communication systems be realized, the modules themselves must be highly reliable since they are typically installed in relatively inaccessible locations (e.g. within conduits running under city streets, etc.). Given this requirement, it can be seen that it would be highly desirable to have monitoring signals that would verify the operation of the modules and the integrity of the fibers themselves. A further requirement for a satisfactory optical communication system is that the modules introduce a minimum of loss into the system. It has only been with the development of extremely high transparency fibers that optical fiber communication has become practical, and the introduction of lossy modules would considerably undercut the advantages and efficacy of such systems.

Unfortunately, existing devices for interfacing fibers to sources, detectors, and each other have proved to be lossy, bulky, delicate, and expensive. Thus, while fiber optic communication systems are proving to be highly advantageous, they are prevented from realizing their fullest potential.

SUMMARY OF THE INVENTION

The present invention provides compact fiber optics coupler modules for interfacing fibers with very low light loss. The modules are characterized by the precise tolerances required in high capacity optical communication systems, and yet they are rugged and may be mass produced at reasonable costs. The input and output terminals of the couplers may be configured so that a small number of basic coupler structures may be used to perform a wide variety of functions.

A coupler according to the present invention comprises a body of optically transparent material having a portion defining a spherical reflective surface characterized by a self-conjugate plane having the property that a point source of light in the self-conjugate plane is imaged in the self-conjugate plane. The coupler includes means adapted to register a source, detector, or fiber end at each of first and second conjugate locations within the self-conjugate plane, such means being designated first and second optical transceiver terminals.

According to one aspect of the present invention, the reflective surface is characterized by a coefficient of reflection sufficiently less than unity so as to permit a detectable fraction of light incident on the reflective surface to pass through it, whereupon a portion of light diverging from the first location passes through the reflective surface along a first optical path (the remaining portion being imaged at the second location). Similarly a portion of light diverging from the second location passes through the reflective surface along a second optical path (the remaining portion being imaged at the first location). The coupler further includes focusing means on the side of the reflective surface remote from the first and second locations for imaging light travelling along the first optical path at a third location. The focusing means typically operates also to image light travelling along the second optical path at a fourth location. The coupler further includes a third optical transceiver terminal adapted to register an optical transceiver at the third location so that optical transceivers located at the first and third locations are optically coupled, as are transceivers located at the first and second locations. Given that the sources and detectors in common use have a larger area than that of a fiber end, it is often appropriate to mount the source or detector away from the particular location in the self-conjugate plane, and communicate the light therefrom or thereto by means of a short length of fiber.

In a first series of embodiments, the reflective surface is partially transmissive, partially reflective for wavelengths in a given range, whereupon the coupler may be configured as a splitter and directional coupler, a directional monitor, or a data bus coupler.

When the transceivers include fibers having their respective ends registered at the first, second, and third locations, the coupler operates as a splitter with respect to light emerging from the end of the first fiber and further operates as a directional coupler by coupling light emerging from the end of the first fiber to the end of the third fiber, but not coupling light emerging from the end of the second fiber to the end of the third fiber.

When the transceivers include fibers having their respective ends registered at the first and second locations and photodetectors registered at the third and fourth locations, the coupler operates as a directional monitor which couples light between the two fiber ends and further provides signals representative of the intensity of light travelling in each direction.

When the transceivers include fibers having their respective ends registered at the first, second, third, and fourth locations, the coupler operates as a data bus coupler.

In a second series of embodiments, the reflective surface is actually a dichroic surface which is substantially reflective for light of a first wavelength and substantially transmissive for light of a second wavelength, whereupon the coupler may be configured as a duplexer, a multiplexer, or a demultiplexer.

When the transceivers include an optical fiber having its end registered at the first location, a source of light of the first wavelength registered at the second location, and a detector sensitive to light of the second wavelength registered at the third location, the coupler operates as a duplexer (bi-directional coupler).

When the transceivers include a fiber having its end registered at the first location, and sources of light of the first and second wavelengths registered at the second and third locations, respectively, the coupler operates as a wavelength multiplexer.

When the transceivers include a fiber having its end registered at the first location, a detector sensitive to light of the first wavelength registered at the second location, and a detector sensitive to light of the second wavelength registered at the third location, the coupler operates as a wavelength demultiplexer.

The focusing means may comprise a lens having multiple refractive interfaces, a lens having a single curved surface, or a graded index lens. In such cases, the third and fourth locations are on the opposite side of the reflective surface from the first and second locations. However, a particularly compact configuration may be achieved for the coupler having the dichroic surface. In such a case, the focusing means may be a second concave mirror located closely behind the dichroic surface, for reflecting the light of the second wavelength back through the dichroic surface. In this case, the third location is generally near the first and second locations.

In an alternate embodiment, a coupler adapted to operate as a multiplexer or demultiplexer, and being especially well adapted for operation at more than two wavelengths, comprises a body of optically transparent material having a portion defining a spherical reflective surface that is characterized by a focal distance such that a point source of light at the focal distance from the reflective surface is collimated by the reflective surface, a main optical transceiver terminal for registering a fiber end (or source or detector) at a main location at the focal distance, first and second branch optical transceiver terminals adapted to register respective transceivers at first and second branch locations at the focal distance, and a plane reflection grating in the path of the light that is collimated by the reflective surface after diverging from the main location. The grating is oriented to reflect collimated light back toward the reflective surface at a wavelength-dependent angle so as to classify the light by wavelength and cause it to be imaged at the various branch locations.

For a further understanding of the nature and advantages of the present invention, reference should be had to the remaining portions of this specification and to the attached drawings.

BRIEF DESCRIPTION OF THE DRAWINGS

FIGS. 2A and 2B illustrate the present invention operating as a directional monitor;

FIG. 3 illustrates the present invention operating as a splitter;

FIGS. 4A and 4B illustrate the present invention operating as a data bus coupler;

FIG. 5 illustrates the present invention operating as a duplexer;

FIG. 6 illustrates the present invention operating as a demultiplexer;

FIG. 7 illustrates the present invention operating as a multiplexer;

FIG. 9 is an oblique sectional view illustrating the detailed construction of the multiplexer embodiment of the present invention;

FIGS. 10A and 10B are enlarged detailed views illustrating the fiber alignment;

DESCRIPTION OF THE PREFERRED EMBODIMENTS

Figure 1A:
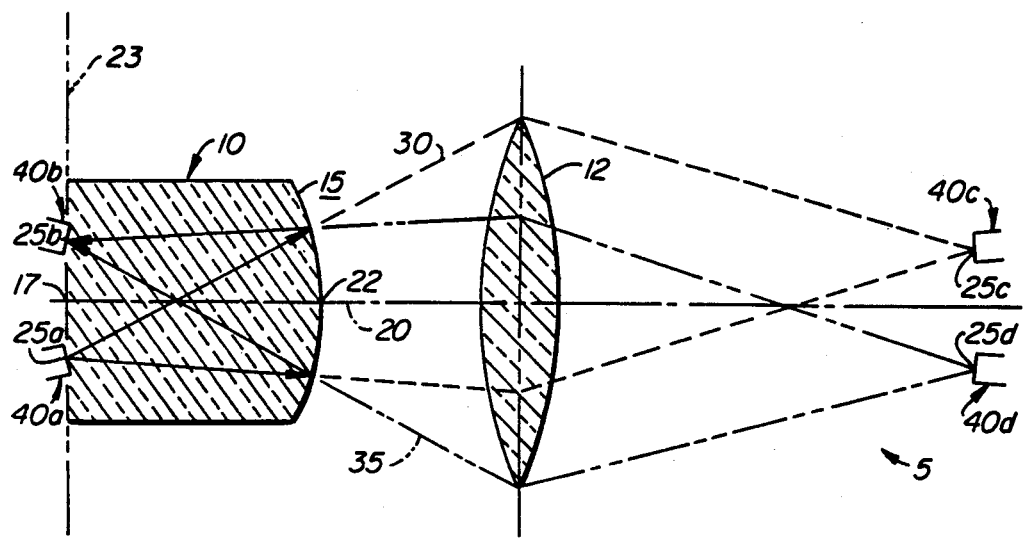
FIG. 1A is an optical schematic of a fiber optics coupler module according to the present invention.

FIG. 1A is an optical schematic of a fiber optics coupler module 5 according to the present invention. Broadly, module 5 includes a body 10 of transparent material, and focusing means such as a lens 12. Body 10 has portions defining a spherical reflective end surface 15 having a center of curvature 17. A radial axis 20 intersects spherical surface 15 at an axial point 22 and defines the body axis. A diametral plane 23 perpendicular to body axis 20 may be drawn. Plane 23 has the property that a point source of light diverging from a first location 25a within plane 23 and relatively close to center of curvature 17 is imaged at a conjugate second location 25b within plane 23. Location 25b is located on the opposite side of center of curvature 17 and is an equal distance therefrom. That is, plane 23 is a self-conjugate plane for those points not far removed from the center of curvature 17. The desirable optical properties of spherical reflective surfaces have been described in parent U.S. application Ser. No. 66,367, now U.S. Pat. No. 4,329,017, and the entire disclosure is hereby incorporated by reference. It is noted in passing that the self-conjugate plane was referred to in the parent as the "focal" plane.

Although the separation between locations 25a and 25b is exaggerated for clarity, as will be described below, the line drawn between location 25a and point 22 is actually only about 1° off body axis 20. It should be noted that since locations 25a and 25b are very close to the center of the curvature, light emanating from either of such points strikes surface 15 almost perpendicularly, and is thus deviated by a very small amount upon passing through surface 15, even if it enters an air space. Accordingly, even though the separation of locations 25a and 25b is exaggerated in the optical schematic, light rays are shown as passing through surface 15 undeviated.

As will be described more fully below, spherical surface 15 is at least partially reflective for at least some wavelengths of light, so that a point source of light diverging from location 25a impinges on surface 15, with a portion being imaged at location 25b and another portion passing through surface 15 along a first optical path 30 to be imaged at a third location 25c by lens 12. Similarly, for a point source of light at location 25b, a portion is imaged at location 25a with another portion passing through surface 15 along a second optical path 35 to be imaged by lens 12 at a fourth location 25d.

When coupler module 5 is configured for a particular situation, locations 25a, 25b, 25c, and sometimes 25d will be occupied by respective optical transceivers, each of which may be a fiber end, a source, or a detector. Accordingly, coupler 5 also includes transceiver terminals 40a, 40b, 40c, and 40d suitable for registering respective transceivers at locations 25a-d, respectively.

It will be immediately apparent to one of ordinary skill in the art that fibers, sources, and detectors may be substituted for one another, with appropriate direction reversals. The description below will be in rather specific terms, but it is envisioned that other equivalent structures may be formed by appropriate substitution of transceivers. Indeed, the flexibility of the present invention is underscored by the fact that, as a practical matter, most sources and detectors in common use have a greater area than the end of a fiber, so that such sources and detectors are typically located at some distance from the respective object or image location, with optical communication being provided by a short length of fiber.

Figure 1B:
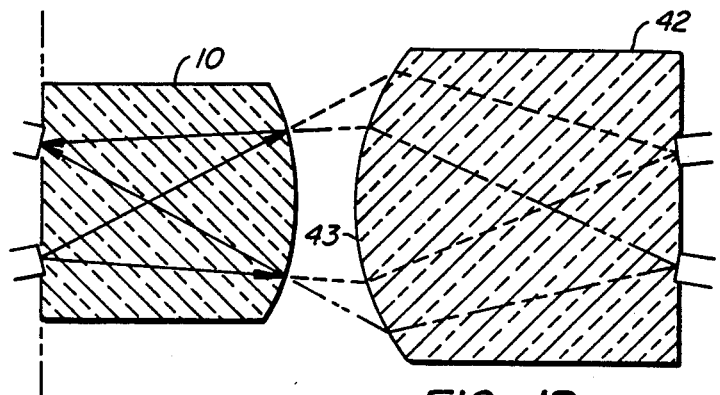
FIGS. 1B and 1C are alternate embodiments characterized by differing focusing means.
Figure 1C:
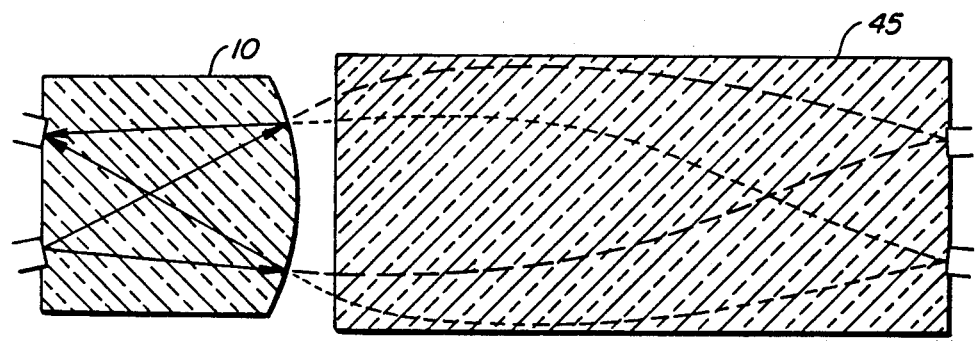

It will also be apparent that the use of a lens having multiple curved refractive surfaces is not the only way to achieve the focusing at locations 25c and 25d. FIGS. 1B and 1C illustrate other possibilities. More particularly, FIG. 1B illustrates an embodiment wherein the focusing means comprises a second body 42 of transparent material having a single curved refractive interface 43 while FIG. 1C illustrates an embodiment wherein the focusing means is provided by a graded index lens 45. The embodiments of FIGS. 1B and 1C will not be illustrated in connection with the various coupler types to be described.

FIGS. 2A-B, 3 and 4A-B illustrate a first series of embodiments in which surface 15 is partly reflective and partly transmissive for the wavelength range of interest. Depending on the application, the coefficient of reflection may be chosen at any desired value, although 50% is useful for certain applications.

FIGS. 2A and 2B illustrate a directional monitor 50 according to the present invention. To this end, the transceivers at locations 25a and 25b are fibers 55a and 55b, while the transceivers at locations 25c and 25d are respective photodetectors 57 and 58. As can be seen from FIG. 2A, when light diverges from the end of fiber 55a, a portion is imaged at location 25b for injection into fiber 55b while a portion passes through partially reflective surface 15 along first optical path 30 to be imaged at location 25c for detection by detector 57. In FIG. 2B, light is diverging from the end of fiber 55b with a portion converging to location 25a for injection into the end of fiber 55a and a portion passing along second optical path 35 for imaging at location 25d for detection by detector 58. Thus, directional monitor 50 provides separate signals representative of the intensity of light travelling in respective directions. The coefficient of transmission of surface 15 need only be as high as will permit satisfactory operation of the photodetectors.

FIG. 3 illustrates a splitter/directional coupler 60 according to the present invention. The transceivers include fibers 65a-c registered with their respective ends at locations 25a-c. Light diverging from the end of fiber 65a is split between fibers 65b and 65c according to the coefficient of reflection of spherical surface 15. However, fibers 65b and 65c are not optically coupled, in the sense that no portion of the light diverging from the end of either such fiber will be injected into the other.

FIGS. 4A and 4B illustrate a data bus coupler 70 according to the present invention. The transceivers include fibers 75a-d having their respective ends registered at locations 25a-d. Assuming the data bus comprises fibers 75a and 75b in serial arrangement, a portion of the light travelling therealong is injected into fiber 75c as described above in connection with splitter 60. Injection onto the bus occurs as shown in FIG. 4B wherein a portion of the light diverging from the end of fiber 75d is injected into fiber 75b while the remaining portion is reflected at surface 15 and passes into fiber 75c.

FIGS. 5, 6, 7, and 8 illustrate a second series of embodiments in which spherical surface 15 carries a dichroic coating that is substantially reflective for wavelengths in a first range and substantially transmissive for wavelengths in a second range. Accordingly, coupler modules so configured may be utilized for simultaneous transmission at first and second wavelengths in the respective ranges.

FIG. 5 illustrates a duplexer 80 adapted to transmit signals at the first wavelength and receive signals at the second wavelength on a single fiber 82 having its end registered at location 25a. To this end, a source 85 of light of the first wavelength provides a point source of light diverging from location 25b, and a detector 87 responsive to light of the second wavelength receives light converging to location 25c. It should be noted that where fast response at detector 87 is not required, detector 87 may be a larger detector located substantially immediately behind dichroic surface 15 without the need for intermediate focusing means such as lens 12. Duplexer 80 would communicate with a complementary device having a detector responsive to the first wavelength at location 25b and a source at the second wavelength at location 25c.

FIG. 6 illustrates a demultiplexer 90 that operates to detect signals at the first and second wavelengths travelling along a single optical fiber 92 having its end registered at location 25a. To this end, a first detector 95 responsive to light of the first wavelength receives such light converging at location 25b, and a second detector 97 responsive to light of the second wavelength receives such light passing through dichroic surface 15. As in the case of duplexer 80, where fast response is not necessary, detector 97 may have an extended geometry and be located proximate surface 15 without the use of focusing means such as lens 12.

FIG. 7 illustrates a multiplexer 100 which operates to inject signals at the first and second wavelengths into a single fiber 102 having its end registered at location 25a. To this end, a source 105 of light of the first wavelength provides a point source diverging from location 25b while a source 107 of light of the second wavelength provides a point source of light diverging from location 25c.

Figure 8:
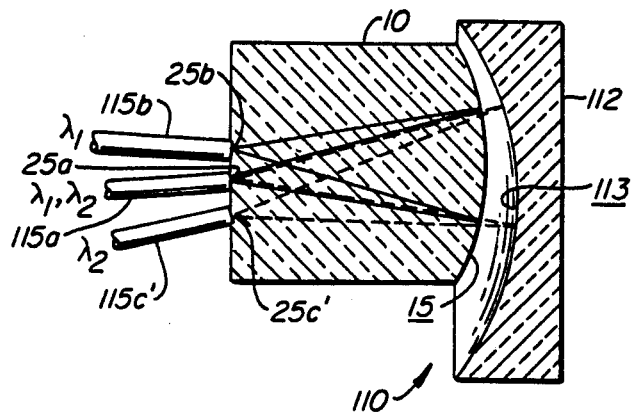
FIG. 8 illustrates an alternate embodiment suitable for the duplexer, demultiplexer, and multiplexer.

FIG. 8 illustrates an alternate embodiment of a coupler 110 that may operate as a duplexer, multiplexer, or demultiplexer, depending on the nature of the transceivers. This embodiment utilizes a concave mirror 112 having a reflective surface 113 as the focusing means, so that light of the second wavelength that passes through dichroic surface 15 is imaged by mirror 112 at a location, designated 25c', that is on the same side of dichroic surface 15 as are locations 25a and 25b. Preferably, location 25c' is proximate locations 25a and 25b. This is achieved by having the center of curvature of mirror surface 113 lie between locations 25a and 25c'. FIG. 8 shows three fibers 115a, 115b, and 115c' having their respective ends registered at locations 25a, 25b, and 25c'. Fiber 25a carries signals at both the first and second wavelengths, and depending on the arrangement of sources and detectors coupled to fibers 115b and 115c', coupler 110 will operate as a duplexer, a multiplexer, or a demultiplexer as described above.

Having described the various embodiments in terms of their optical schematics, a preferred mechanical construction will now be described. For definiteness, the embodiment of FIG. 8 will be described. The embodiment described below has been designed for use with a standard type of graded index fiber, but the present invention may be used with other fiber types as well. The standard fiber comprises a 50-micron diameter fused silica core that is doped to have a radially varying refractive index with an average value of about 1.45. The core is surrounded by a 125-micron diameter fused silica cladding which is itself surrounded by a 250-micron diameter protective plastic coating. Such fiber is characterized by a numerical aperture of approximately 0.2, which means that the light emerging from a fiber end into an index matched material is confined to a cone having a 0.4-radian full angle.

FIG. 9 is a sectioned oblique view of coupler 110 according to a preferred construction. Transparent body 10 comprises a plano-convex element 120 and a flat spacer element 122, both constructed of glass having a refractive index of 1.50 which is closely matched to the refractive index of the fiber core. Element 120 and spacer 122 are cemented with index matching cement. Although the overall dimensions of the optical portions of the coupler may be scaled, the following description will be in terms of a device where the radius of curvature of surface 15 is approximately 0.42 inches. This means that for a 2° angle between the fiber axes, a 0.012-inch separation of the axes at the fiber ends is appropriate. For alignment reasons, the body thickness is made slightly less than the radius of curvature.

The fiber ends are maintained in alignment in a fiber alignment support 125 as will be more fully described below. Body 10 and fiber alignment support 125 are located within a housing 127 which comprises a cylindrical wall portion 130, an optical support element 132, an opaque end cap 135, and a fiber jacket holder 137. The fibers emerge from housing 127 through respective ⅛-inch diameter jackets 142, each of which has a ferrule 143 anchored thereon. The ferrules and jacket ends are epoxied into jacket holder 137 in order to provide strain relief.

FIG. 10A is a cutaway isometric view illustrating the manner in which the end portions of fibers 115a, 115b, and 115c' are maintained in proper alignment relative to one another. Each fiber end is enclosed within a stainless steel sleeve 145 having a 0.012 inch outer diameter and a 0.006 inch bore sized to accomodate the fiber with the protective coating removed. Referring also to FIG. 10B, it may be seen that fiber alignment support 125 is generally cylindrical with an outer diameter of about 0.25 inches. A relatively wide (0.08 inches) channel 147 extends the entire longitudinal dimension of the support, and has a radial depth that reaches almost to the central axis 150. A 0.012-inch wide channel 152 extends from the bottom of channel 147 to a radial depth beyond axis 150. The bottom of channel 152 is inclined at 2° from axis 150. Thus, when sleeved fiber 115c' is in channel 150 and sleeved fiber 115a is aligned along axis 150, the appropriate overall alignment is maintained. These two fibers are epoxied into position and sleeved fiber 115b is then aligned at 2° relative to fiber 115a. It is noted that the three sleeves are in contact at one end to define the fibers' points of closest approach, and have a predetermined separation at the other end (about 0.008 inches) to define the angular inclination.

Once the three sleeved fibers have been glued to the fiber alignment support, assembly of the device occurs as follows. Body 10 is held in a fixed jig and the fiber alignment support (with the sleeved fibers cemented thereto) is mounted in a positioning fixture which may be translated and rotated relative to the body. Light of the first wavelength is directed into fiber 115a, and the fiber alignment support is moved around until the light emerging from fiber 115b is maximized. The fiber alignment support and the transparent body are then glued together with index matching cement. The entire glued assembly is then held in a fixed jig, and mirror 112 is mounted in the positioning fixture. Light of the second wavelength is directed into fiber 115a, and mirror 113 is translated and tilted to maximize the amount of light emerging from fiber 115c'. Index matching cement is used to glue mirror 112 to body 10 in order to maintain the relative alignment. The index matching cement is preferably allowed to fill the interstice between surfaces 15 and 113, although this is not critical. Once the optical elements have been relatively aligned, the entire rigid assembly is mounted to optical support 132, and ferrules 143 and the ends of jackets 142 are epoxied into fiber jacket holder 137.

Figure 11A:
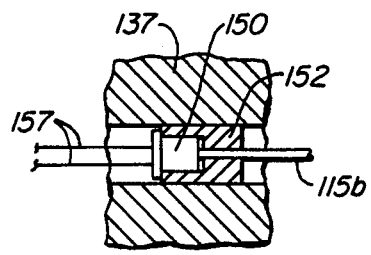
FIGS. 11A and 11B are sectional views illustrating preferred source and detector mountings.
Figure 11B:
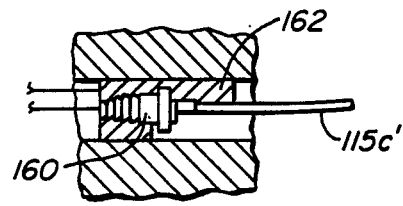

The device illustrated in FIG. 9 has three jacketed fibers emerging from the housing, and may therefore be configured as a multiplexer, demultiplexer, or duplexer by the appropriate provision of source and detectors. However, it is sometimes convenient to mount detectors and sources within the module. In such a case, one or both of fibers 115b and 115c' do not extend outside the housing. FIG. 11A is a detailed sectional view illustrating a preferred mounting for a detector within fiber jacket holder 137. The detector comprises a photodiode 150 mounted within a photodiode holder 152 which fits within the bore otherwise occupied by a jacket ferrule. Photodiode holder 152 includes a central bore sized to accommodate one end of fiber 115b (or 115c'), the other end of which is aligned and mounted to the fiber alignment support as described above. Two electrical wires 157 pass through the fiber jacket bore for connection to an appropriate power supply. FIG. 11B illustrates a source mounted within the module. The source comprises a light emitting diode (LED) 160 mounted within the ferrule-receiving bore by an appropriate LED holder 162. Holder 162 is also configured to hold one end of fiber 115b (or 115c') registered to LED 160 with the other fiber end aligned and mounted to the fiber alignment support as described above.

Figure 12:
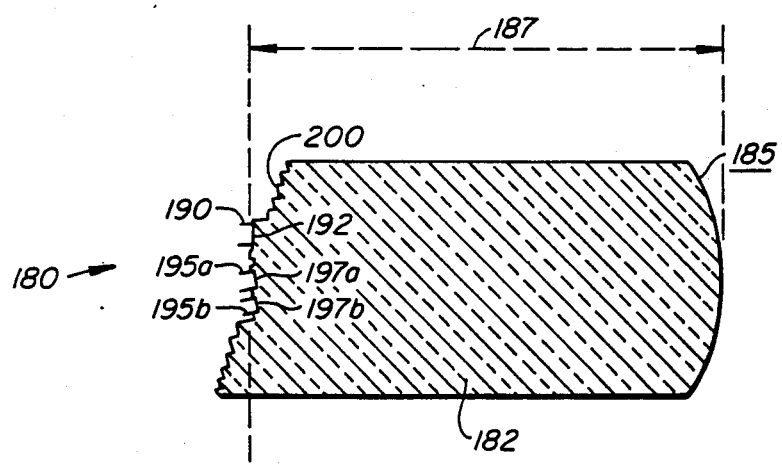
FIG. 12 is an optical schematic of an alternate embodiment of a coupler adapted to operate as a multiplexer or demultiplexer.

FIG. 12 is an optical schematic of an alternate embodiment of a coupler 180 adapted to operate as a multiplexer or demultiplexer. Coupler 180 comprises a body 182 of optically transparent material having a portion defining a spherical reflective surface 185. Surface 185 is characterized by a focal distance 187 such that a point source of light at the focal distance is collimated by surface 185. At focal distance 187 are located a main transceiver terminal 190 at a main location 192, and first and second branch transceiver terminals 195a and 195b at respective branch locations 197a and 197b. A plane reflection grating 200 is disposed in the path of light that is collimated by surface 185 after diverging from main location 192. The grating is oriented to reflect the collimated light back toward surface 185 at a wavelength-dependent angle such that collimated light of a first wavelength is imaged at first branch location 197a while collimated light of a second wavelength is imaged at the second branch location 197b. While only two branch locations are shown, it will be appreciated that more could be used, and in fact coupler 180 is especially well adapted for operation with more than two wavelengths.

In summary it can be seen that the present invention provides a surprisingly flexible design for fiber optics coupler modules wherein minor reconfigurations of the inputs and the reflective coatings allow a wide variety of functions to be performed. The modules provide coupling with very low loss, and the configuration with a spherical reflective surface and sources located near the center of curvature provides a minimum of aberrations and preservations of modes. It will be appreciated that the multiplexer embodiment utilizing mirror 112 has the advantages of completely monolithic construction with a greatly reduced crosstalk in one channel due to dual passage of light of the second wavelength through the dichroic surface.

While the above provides a full and complete disclosure of the preferred embodiments of this invention, it will be appreciated that various modifications, alternate constructions, and equivalents may be employed without departing from the spirit and scope of the invention. For example, the fiber alignment support could comprise a simple semicylindrical element, with the fibers being cemented to a flat surface and the alignment being accomplished by a positioning jig. Moreover, it is possible to utilize a different angular separation between the input and output axes, with appropriate adjustments to the separation in the self-conjugate plane. Therefore, the above description and illustrations should not be construed as limiting the scope of the invention which is defined by the appended claims.

We claim:

1. A fiber optics coupler comprising:
a body of optically transparent material having a portion defining a spherical reflective surface characterized by a self-conjugate plane having the property that a point source of light in said self-conjugate plane is imaged in said self-conjugate plane;
a first optical transceiver terminal adapted to register an optical transceiver at a first location within said self-conjugate plane;
a second optical transceiver terminal adapted to register an optical transceiver at a second location within said self-conjugate plane separated from said first location, said first and second locations being on opposite sides of a radial axis, being displaced equal amounts from said radial axis such that the center of curvature of said spherical reflective surface lies on the straight line between said first and second locations, whereupon said first and second locations are conjugate so that a point source of light at one of said first and second locations is imaged by said reflective surface at the other of said first and second locations;
said reflective surface being characterized by a coefficient of reflection sufficiently less than unity so as to permit a detectable fraction of light incident on said reflective surface to pass therethrough, whereupon a portion of light diverging from said first location passes through said reflective surface along a first optical path and a portion of light diverging from said second location passes through said reflective surface along a second optical path;
focusing means on the side of said reflective surface remote from said self-conjugate plane for imaging light travelling along said first optical path at a third location; and
a third optical transceiver terminal adapted to register an optical transceiver at said third location to provide optical coupling between optical transceivers located at said first and third locations.

2. A fiber optics coupler comprising:
a body of optically transparent material having a portion defining an imaging reflective surface;
a first optical transceiver terminal adapted to register an optical transceiver at a first location;
a second optical transceiver terminal adapted to register an optical transceiver at a second location conjugate with respect to said first location whereupon a point source of light at one of said first and second locations is imaged by said reflective surface at the other of said first and second locations;
said reflective surface being characterized by a coefficient of reflection sufficiently less than unity so as to permit a detectable fraction of light incident on said reflective surface to pass therethrough whereupon a portion of light diverging from said first location passes through said reflective surface along a first optical path and a portion of light diverging from said second location passes through said reflective surface along a second optical path;
focusing means on the side of said reflective surface remote from said first and second locations for imaging light travelling along said first optical path at a third location; and
a third optical transceiver terminal adapted to register an optical transceiver at said third location to provide optical coupling between optical transceivers located at said first and third locations.

3. A fiber optics coupler comprising:
means defining a spherical reflective surface characterized by a self-conjugate plane having the property that a point source of light in said self-conjugate plane is imaged in said self-conjugate plane;
a first optical transceiver terminal adapted to register an optical transceiver at a first location within said self-conjugate plane;
a second optical transceiver terminal adapted to register an optical transceiver at a second location within said self-conjugate plane separated from said first location, said first and second locations being on opposite sides of a radial axis, being displaced equal amounts from said radial axis such that the center of curvature of said spherical reflective surface lies on the straight line between said first and second locations, whereupon said first and second locations are conjugate so that a point source of light at one of said first and second locations is imaged by said reflective surface at the other of said first and second locations;

said reflective surface being characterized by a coefficient of reflection sufficiently less than unity so as to permit a detectable fraction of light incident on said reflective surface to pass therethrough, whereupon a portion of light diverging from said first location passes through said reflective surface along a first optical path and a portion of light diverging from said second location passes through said reflective surface along a second optical path;

focusing means on the side of said reflective surface remote from said self-conjugate plane for imaging light travelling along said first optical path at a third location; and a third optical transceiver terminal adapted to register an optical transceiver at said third location to provide optical coupling between optical transceivers located at said first and third locations.

4. A fiber optics coupler comprising:
means defining an imaging reflective surface;
a first optical transceiver terminal adapted to register an optical transceiver at a first location;
a second optical transceiver terminal adapted to register an optical transceiver at a second location conjugate with respect to said first location whereupon a point source of light at one of said first and second locations is imaged by said reflective surface at the other of said first and second locations;
said reflective surface being characterized by a coefficient of reflection sufficiently less than unity so as to permit a detectable fraction of light incident on said reflective surface to pass therethrough whereupon a portion of light diverging from said first location passes through said reflective surface along a first optical path and a portion of light diverging from said second location passes through said reflective surface along a second optical path;
focusing means on the side of said reflective surface remote from said first and second locations for imaging light travelling along said first optical path at a third location; and
a third optical transceiver terminal adapted to register an optical transceiver at said third location to provide optical coupling between optical transceivers located at said first and third locations.

5. The invention of claim 1 or 2 or 3 or 4 wherein said focusing means operates to image light travelling along said second optical path at a fourth location, and further comprising a fourth optical transceiver terminal adapted to register an optical transceiver at said fourth location to provide optical coupling between optical transceivers located at said second and fourth locations.

6. The invention of claim 5, and further comprising first and second photodetectors registered at said third and fourth locations by said third and fourth optical transceiver terminals to provide electrical signals representative of the intensity of light diverging from said first and second locations, respectively, whereupon said coupler operates as a directional monitor.

7. The invention of claim 5, and further comprising first, second, third, and fourth optical fibers having respective ends registered at said first, second, third, and fourth locations by said first, second, third, and fourth optical transceiver terminals, whereupon said coupler operates as a data bus coupler.

8. The invention of claim 1 or 2 or 3 or 4, and further comprising first, second, and third fibers having respective ends registered at said first, second, and third locations by said first, second, and third optical transceiver terminals, whereupon said coupler operates as a splitter with respect to light emerging from the end of said first fiber and further operates as a directional coupler by coupling light emerging from the end of said first fiber to the end of said third fiber but not coupling light emerging from the end of said second fiber to the end of said third fiber.

9. The invention of claim 1 or 2 or 3 or 4 wherein said third location is on the side of said reflective surface remote from said first and second locations.

10. A fiber optics coupler comprising:
a body of optically transparent material having a portion defining a spherical dichroic surface that is substantially reflective for light of a first wavelength and substantially transmissive for light of a second wavelength, said surface being characterized by a self-conjugate plane having the property that a point source of light of said first wavelength in said self-conjugate plane is imaged in said self-conjugate plane;
a first optical transceiver terminal adapted to register an optical transceiver at a first location within said self-conjugate plane;
a second optical transceiver terminal adapted to register an optical transceiver at a second location within said self-conjugate plane separated from said first location, said first and second locations being on opposite sides of a radial axis, being displaced equal amounts from said radial axis such that the center of curvature of said spherical dichroic surface lies on the straight line between said first and second locations, whereupon said first and second locations are conjugate so that a point source of light of said first wavelength at one of said first and second locations is imaged at the other of said first and second locations;
whereupon light of said first wavelength diverging from said first location is imaged at said second location while light of said second wavelength diverging from said first location passes through said dichroic surface along a first optical path, and whereupon light of said first wavelength diverging from said second location is imaged by said dichroic surface at said first location while light of said second wavelength diverging from said second location passes through said dichroic surface along a second optical path;
focusing means on the side of said dichroic surface remote from said self-conjugate plane for imaging light travelling along said first optical path at a third location; and
a third optical transceiver terminal adapted to register an optical transceiver at said third location to provide optical coupling at said second wavelength between optical transceivers located at said first and third locations.

11. A fiber optics coupler comprising:
a body of optically transparent material having a portion defining an imaging dichroic surface that is substantially reflective for light of a first wavelength and substantially transmissive for light of a second wavelength;

a first optical transceiver terminal adapted to register an optical transceiver at a first location;

a second optical transceiver terminal adapted to register an optical transceiver at a second location conjugate with respect to said first location whereupon a point source of light of said first wavelength at one of said first and second locations is imaged by said dichroic surface at the other of said first and second locations;

whereupon light of said first wavelength diverging from said first location is imaged at said second location while light of said second wavelength diverging from said first location passes through said dichroic surface along a first optical path, and whereupon light of said first wavelength diverging from said second location is imaged by said dichroic reflective surface at said first location while light of said second wavelength diverging from said second location passes through said dichroic surface along a second optical path;

focusing means on the side of said dichroic surface remote from said first and second locations for imaging light travelling along said first optical path at a third location; and a third optical transceiver terminal adapted to register an optical transceiver at said third location to provide optical coupling at said second wavelength between optical transceivers located at said first and third locations.

12. A fiber optics coupler comprising:

means defining a spherical dichroic surface that is substantially reflective for light of a first wavelength and substantially transmissive for light of a second wavelength, said surface being characterized by a self-conjugate plane having the property that a point source of light of said first wavelength in said self-conjugate plane is imaged in said self-conjugate plane;

a first optical transceiver terminal adapted to register an optical transceiver at a first location within said self-conjugate plane;

a second optical transceiver terminal adapted to register an optical transceiver at a second location within said self-conjugate plane separated from said first location, said first and second locations being on opposite sides of a radial axis, being displaced equal amounts from said radial axis such that the center of curvature of said spherical dichroic surface lies on the straight line between said first and second locations, whereupon said first and second locations are conjugate so that a point source of light of said first wavelength at one of said first and second locations is imaged at the other of said first and second locations;

whereupon light of said first wavelength diverging from said first location is imaged at said second location while light of said second wavelength diverging from said first location passes through said dichroic surface along a first optical path, and whereupon light of said first wavelength diverging from said second location is imaged by said dichroic surface at said first location while light of said second wavelength diverging from said second location passes through said dichroic surface along a second optical path;

focusing means on the side of said dichroic surface remote from said self-conjugate plane for imaging light travelling along said first optical path at a third location; and a third optical transceiver terminal adapted to register an optical transceiver at said third location to provide optical coupling at said second wavelength between optical transceivers located at said first and third locations.

13. A fiber optics coupler comprising:

means defining an imaging dichroic surface that is substantially reflective for light of a first wavelength and substantially transmissive for light of a second wavelength;

a first optical transceiver terminal adapted to register an optical transceiver at a first location;

a second optical transceiver terminal adapted to register an optical transceiver at a second location conjugate with respect to said first location whereupon a point source of light of said first wavelength at one of said first and second locations is imaged by said dichroic surface at the other of said first and second locations;

whereupon light of said first wavelength diverging from said first location is imaged at said second location while light of said second wavelength diverging from said first location passes through said dichroic surface along a first optical path, and whereupon light of said first wavelength diverging from said second location is imaged by said dichroic reflective surface at said first location while light of said second wavelength diverging from said second location passes through said dichroic surface along a second optical path;

focusing means on the side of said dichroic surface remote from said first and second locations for imaging light travelling along said first optical path at a third location; and a third optical transceiver terminal adapted to register an optical transceiver at said third location to provide optical coupling at said second wavelength between optical transceivers located at said first and third locations.

14. The invention of claim 10 or 11 or 12 or 13 wherein said focusing means operates to image light travelling along said second optical path at a fourth location, and further comprising a fourth optical transceivers terminal adapted to register an optical transceiver at said fourth location to provide coupling at said second wavelength between optical transceivers located at said second and fourth locations.

15. The invention of claim 10 or 11 or 12 or 13 wherein said focusing means comprises a concave mirror, and wherein said third location is on the same side of said dichroic surface as said first and second locations.

16. The invention of claim 10 or 11 or 13 wherein said third location is on the side of said dichroic surface remote from said first and second locations.

17. The invention of claim 1 or 2 or 10 or 11 or 3 or 4 or 12 or 13 wherein said focusing means comprises a lens having at least two refractive interfaces.

18. The invention of claim 1 or 2 or 10 or 11 or 3 or 4 or 12 or 13 wherein said focusing means comprises a body of optically transparent material having a single curved refracting surface.

19. The invention of claim 1 or 2 or 10 or 11 or 3 or 4 or 12 or 13 wherein said focusing means comprises a graded index lens.

20. A coupler for permitting optical signals at first and second wavelengths to be transmitted simultaneously on a single optical fiber comprising:
a first optical transceiver terminal adapted to register an optical transceiver at a first location;
a dichroic beam splitter for directing light of said first wavelength diverging from said first location along a first optical trajectory and light of said second wavelength diverging from said first location along a second optical trajectory, at least a portion of which is separated from said first optical trajectory;
means defining a first spherical reflective surface in said first optical trajectory wherein light of said first wavelength diverging from said first location is imaged at a second location;
means defining a spherical reflective surface in said second optical trajectory wherein light of said second wavelength diverging from said first location is imaged at a third location separate from said second location; and
second and third optical transceiver terminals adapted to register respective optical transceivers at said second and third locations.

21. The invention of claim 20 wherein said dichroic beam splitter and said first reflective surface are one and the same.

22. A fiber optics coupler comprising:
a body of optically transparent material having a portion defining a spherical dichroic surface that is substantially reflective for light of a first wavelength and substantially transmissive for light of a second wavelength, said surface being characterized by a self-conjugate plane having the property that a point source of light of said first wavelength in said self-conjugate plane is imaged in said self-conjugate plane;
a first optical transceiver terminal adapted to register an optical transceiver at a first location within said self-conjugate plane;
a second optical transceiver terminal adapted to register an optical transceiver at a second location within said self-conjugate plane separated from said first location, said first and second locations being on opposite sides of a radial axis, being displaced equal amounts from said radial axis such that the center of curvature of said spherical dichroic surface lies on the straight line between said first and second locations, whereupon said first and second locations are conjugate so that a point source of light of said first wavelength at one of said first and second locations is imaged at the other of said first and second locations;
whereupon light of said first wavelength diverging from said first location is imaged at said second location while light of said second wavelength diverging from said first location passes through said dichroic surface along a first optical path, and whereupon light of said first wavelength diverging from said second location is imaged by said dichroic surface at said first location while light of said second wavelength diverging from said second location passes through said dichroic surface along a second optical path;
mirror means having a portion defining a spherical surface that is at least partly reflective for light of said second wavelength, said mirror means being interposed in said first optical path to reflect light of said second wavelength back through said dichroic surface and image said light thus reflected at a third location proximate said first and second locations; and
a third optical transceiver terminal adapted to register an optical transceiver at said third location to provide optical coupling at said second wavelength between optical transceivers located at said first and third locations.

23. The invention of claim 10 or 22 or 11 or 20, and further comprising:
an optical fiber having an end registered at said first location by said first optical transceiver terminal;
a source of light of said first wavelength registered at said second location by said second optical transceiver terminal; and
a detector sensitive to light of said second wavelength registered at said third location by said third optical transceiver terminal;
whereupon said coupler operates as a duplexer.

24. The invention of claim 10 or 22 or 11 or 20, and further comprising:
a fiber having an end registered at said first location by said first optical transceiver terminal;
a source of light of said first wavelength registered at said second location by said second optical transceiver terminal; and
a source of light of said second wavelength registered at said third location by said third optical transceiver terminal;
whereupon said coupler operates as a wavelength multiplexer.

25. The invention of claim 10 or 22 or 11 or 20, and further comprising:
a fiber having an end registered at said first location by said first optical transceiver terminal;
a detector sensitive to light of said first wavelength registered at said second location by said second optical transceiver terminal; and
a detector sensitive to light of said second wavelength registered at said third location by said third optical transceiver;
whereupon said coupler operates as a wavelength demultiplexer.

26. A fiber optics coupler comprising:
a body of optically transparent material having a portion defining a spherical dichroic surface that is substantially reflective for light of a first wavelength and substantially transmissive for light of a second wavelength, said surface being characterized by a self-conjugate plane having the property that a point source of light of said first wavelength in said self-conjugate plane is imaged in said self-conjugate plane,
a first optical transceiver terminal adapted to register an optical transceiver at a first location within said self-conjugate plane;
a second optical transceiver terminal adapted to register an optical transceiver at a second location within said self-conjugate plane separated from said first location, said first and second locations being on opposite sides of a radial axis, being displaced equal amounts from said radial axis such that the center of curvature of said spherical dichroic surface lies on the straight line between said first and second locations, whereupon said first and second locations are conjugate so that a point source of light of said first wavelength at one of said first and second locations is imaged at the other of said first and second locations;

whereupon light of said first wavelength diverging from said first location is imaged at said second location while light of said second wavelength diverging from said first location passes through said dichroic surface along a first optical path, and whereupon light of said first wavelength diverging from said second location is imaged by said dichroic surface at said first location while light of said second wavelength diverging from said second location passes through said dichroic surface along a second optical path; and a detector responsive to light of said second wavelength interposed in said first optical path.

27. The invention of claim 26, and further comprising:

an optical fiber having an end registered at said first location by said first optical transceiver terminal; and a source of light of said first wavelength registered at said second location by said second optical transceiver terminal whereupon said coupler operates as a duplexer.

28. The invention of claim 26, and further comprising:

a fiber having an end registered at said first location by said first optical transceiver terminal; and a detector sensitive to light of said first wavelength registered at said second location by said second optical transceiver terminal;

whereupon said coupler operates as a wavelength demultiplexer.

29. A fiber optics coupler comprising:

a body of optically transparent material having a portion defining a spherical reflective surface characterized by a focal distance having the property that a point source of light at said focal distance from said reflective surface is collimated by said reflective surface;

a main optical transceiver terminal adapted to register an optical transceiver at a main location located at said focal distance from said reflective surface;

first and second branch optical transceiver terminals adapted to register respective first and second branch optical transceivers at respective first and second branch locations located at said focal distance from said reflective surface; and means defining a plane reflection grating in the path of collimated light arising from reflection of light diverging from said main location;

said grating being oriented to reflect collimated light of a first wavelength toward said reflective surface for imaging at said first branch location and to reflect collimated light of a second wavelength toward said reflective surface to be imaged at said second branch location.

30. A fiber optics coupler comprising:

means defining a spherical dichroic surface that is substantially reflective for light of a first wavelength and substantially transmissive for light of a second wavelength, said surface being characterized by a self-conjugate plane having the property that a point source of light of said first wavelength in said self-conjugate plane is imaged in said self-conjugate plane;

a first optical transceiver terminal adapted to register an optical transceiver at a first location within said self-conjugate plane;

a second optical transceiver terminal adapted to register an optical transceiver at a second location within said self-conjugate plane separated from said first location, said first and second locations being on opposite sides of a radial axis, being displaced equal amounts from said radial axis such that the center of curvature of said spherical dichroic surface lies on the straight line between said first and second locations, whereupon said first and second locations are conjugate so that a point source of light of said first wavelength at one of said first and second locations is imaged at the other of said first and second locations;

whereupon light of said first wavelength diverging from said first location is imaged at said second location while light of said second wavelength diverging from said first location passes through said dichroic surface along a first optical path, and whereupon light of said first wavelength diverging from said second location is imaged by said dichroic surface at said first location while light of said second wavelength diverging from said second location passes through said dichroic surface along a second optical path;

mirror means having a portion defining a spherical surface that is at least partly reflective for light of said second wavelength, said mirror means being interposed in said first optical path to reflect light of said second wavelength back through said dichroic surface and image said light thus reflected at a third location proximate said first and second locations; and a third optical transceiver terminal adapted to register an optical transceiver at said third location to provide optical coupling at said second wavelength between optical transceivers located at said first and third locations.

31. A fiber optics coupler comprising:

means defining an imaging reflective surface characterized by a focal distance having the property that a point source of light at said focal distance from said reflective surface is collimated by said reflective surface;

a main optical transceiver terminal adapted to register an optical transceiver at a main location located at said focal distance from said reflective surface;

first and second branch optical transceiver terminals adapted to register respective first and second branch optical transceivers at respective first and second branch locations located at said focal distance from said reflective surface; and means defining a plane reflection grating in the path of collimated light arising from reflection of light diverging from said main location;

said grating being oriented to reflect collimated light of a first wavelength toward said reflective surface for imaging at said first branch location and to reflect collimated light of a second wavelength toward said reflective surface to be imaged at said second branch location.

* * * * *